(12) United States Patent
Tanabe et al.

(10) Patent No.: US 9,322,837 B2
(45) Date of Patent: Apr. 26, 2016

(54) SEMICONDUCTOR DEVICE

(75) Inventors: Akira Tanabe, Kanagawa (JP);
Yasutaka Nakashiba, Kanagawa (JP)

(73) Assignee: Renesas Electronics Corporation, Tokyo (JP)

( * ) Notice: Subject to any disclaimer, the term of this patent is extended or adjusted under 35 U.S.C. 154(b) by 0 days.

(21) Appl. No.: 14/427,438

(22) PCT Filed: Sep. 12, 2012

(86) PCT No.: PCT/JP2012/073382
§ 371 (c)(1),
(2), (4) Date: Mar. 11, 2015

(87) PCT Pub. No.: WO2014/041648
PCT Pub. Date: Mar. 20, 2014

(65) Prior Publication Data
US 2015/0233964 A1   Aug. 20, 2015

(51) Int. Cl.
*H01L 29/84* (2006.01)
*G01P 15/00* (2006.01)

(52) U.S. Cl.
CPC .................... *G01P 15/008* (2013.01)

(58) Field of Classification Search
CPC ......... H01L 29/84; G01L 19/69; G01L 19/04; G01L 19/143; G01P 15/008
USPC ...................................... 257/415
See application file for complete search history.

(56) References Cited

U.S. PATENT DOCUMENTS

| | | |
|---|---|---|
| 5,719,333 A | 2/1998 | Hosoi et al. |
| 6,182,509 B1 | 2/2001 | Leung |
| 6,316,840 B1 | 11/2001 | Otani |
| 2005/0265422 A1 | 12/2005 | Bonne |
| 2005/0274187 A1 | 12/2005 | Zhao et al. |
| 2008/0250859 A1 | 10/2008 | Nakatani |
| 2013/0174654 A1* | 7/2013 | Schneider ................. G01F 1/00 73/114.01 |
| 2013/0285167 A1* | 10/2013 | Otte .................... G01L 19/0069 257/415 |

FOREIGN PATENT DOCUMENTS

| | | |
|---|---|---|
| JP | 7-260820 A | 10/1995 |
| JP | 8-330476 A | 12/1996 |
| JP | 9-236616 A | 9/1997 |
| JP | 10-332455 A | 12/1998 |
| JP | 11-211750 A | 8/1999 |
| JP | 2000-46859 A | 2/2000 |
| JP | 2001-227902 A | 8/2001 |

(Continued)

OTHER PUBLICATIONS

International Search Report from International Patent Application No. PCT/JP2012/073382, Oct. 16, 2012.

(Continued)

*Primary Examiner* — Brook Kebede
(74) *Attorney, Agent, or Firm* — Shapiro, Gabor and Rosenberger, PLLC

(57) ABSTRACT

In a semiconductor device, a heater is formed on a surface of a cap chip, and a first temperature sensor and a second temperature sensor are formed on a surface of a base chip. The cap chip and the base chip are laminated through a connection member such that the surfaces oppose to each other. The position of the heater is different from the positions of the temperature sensors in a direction of the lamination. The heater in the cap chip contacts bumps directly.

18 Claims, 22 Drawing Sheets

(56) References Cited

FOREIGN PATENT DOCUMENTS

| | | |
|---|---|---|
| JP | 2004-037105 A | 2/2004 |
| JP | 2005-351892 A | 12/2005 |
| JP | 2008-39519 A | 2/2008 |
| JP | 2009-122041 A | 6/2009 |

OTHER PUBLICATIONS

International Preliminary Report on Patentability from International Patent Application No. PCT/JP2012/073382, Mar. 17, 2015.
Office Action issued Aug. 4, 2015, in Japanese Patent Application No. 2014-535294.

* cited by examiner

SEMICONDUCTOR DEVICE

TECHNICAL FIELD

The present invention is related to a semiconductor device, especially to a semiconductor device with a gas type acceleration sensor.

BACKGROUND ART

In recent years, an acceleration sensor is widely used in mobile information equipment such as a smart phone, a tablet PC, and a mobile game machine. As the typical acceleration sensor, there are known the acceleration sensors of a capacitance type (e.g. Patent Literature 1), a piezo resistance type (e.g. Patent Literature 2), and a gas type (e.g. Patent Literature 3, Patent Literature 4, and Patent Literature 5).

The acceleration sensor of the capacitance type or the piezo resistance type uses a MEMS (Micro-Electro Mechanical Systems) device. In detail, "a mechanical movable portion" is formed in the semiconductor chip by use of the MEMS technique. The movement of the movable portion due to the acceleration to the semiconductor chip is detected through a change in capacitance or piezo resistance. However, the formation of the mechanical movable portion in the semiconductor chip is not desirable in the viewpoints of reduction of a production yield and increase of a manufacturing cost.

In case of the acceleration sensor of the gas type, a heater and a temperature sensor are disposed in a space formed in the semiconductor chip, and moreover a gas is injected and sealed into the space. The gas moves in the space due to the acceleration to the semiconductor chip, so as to change the temperature distribution of the gas. The acceleration to the semiconductor chip is detected by detecting the change of the temperature distribution of the gas by the temperature sensor. In case of this gas type acceleration sensor, "the mechanical movable portion" is unnecessary, which is desirable from the viewpoints of the production yield and the manufacturing cost.

Note that the following techniques are known regarding to a general sensor. Patent Literature 6 discloses a method of attaching the whole package of the acceleration sensor in perpendicular to a printed circuit board. Patent Literature 7 discloses a method of arranging a magnetic sensor on a substrate of a tapered shape.

CITATION LIST

[Patent Literature 1] JP 2000-046859A
[Patent Literature 2] JP H09-236616A
[Patent Literature 3] U.S. Pat. No. 6,182,509B1
[Patent Literature 4] JP 2005-351892A
[Patent Literature 5] JP 2008-39519A
[Patent Literature 6] JP H11-211750A
[Patent Literature 7] JP 2009-122041A

SUMMARY OF THE INVENTION

A gas type acceleration sensor is wanted which can detect acceleration in a plurality of directions and is configured effectively in viewpoint of the structure and manufacture, unlike the conventional acceleration sensors.

Other objects and new features will become apparent from the description of this Specification and the attached drawings.

In an embodiment, a semiconductor device is provided. The semiconductor device includes a gas type acceleration sensor which contains a heater, a first temperature sensor and a second temperature sensor as components. The semiconductor device further includes a first chip, on a first surface of which a heater is formed, a second chip, on a second surface of which the first temperature sensor and the second temperature sensor are formed, and a connection member which connects the first chip and the second chip electrically. The first chip and the second chip are laminated through the connection member such that the first surface and the second surface oppose to each other. The position of the heater is different from the position of the first temperature sensor and the position of the second temperature sensor in the direction of lamination of the first chip and the second chip. The first temperature sensor and the second temperature sensor are arranged in a first in-plane direction orthogonal to the lamination direction to sandwich the heater and to oppose to each other. One of the first chip and the second chip is a base chip and the other is a cap chip laminated on the base chip. The component of the gas type acceleration sensor formed in the cap chip contacts the connection member directly.

In another embodiment, a method of manufacturing a semiconductor device is provided. The semiconductor device includes a gas type acceleration sensor which contains a heater, a first temperature sensor and a second temperature sensor as components. The method of manufacturing the semiconductor device includes (A) forming the heater as one of the components on a first surface of a first chip; (B) forming the first temperature sensor and the second temperature sensor as two of the components on a second surface of a second chip; and (C) flip-connecting the first chip and second chip through connection members such that the first surface and the second surface oppose to each other. The position of the heater is different from the positions of the first temperature sensor and second temperature sensor in the direction of lamination of the first chip and the second chip. The first temperature sensor and the second temperature sensor are arranged in a first in-plane direction orthogonal to the lamination direction to sandwich the heater and to oppose to each other. One of the first chip and the second chip is a base chip and the other is a cap chip laminated on the base chip. The components of the gas type acceleration sensor formed on the cap chip contact the connection member directly.

The gas type acceleration sensor is realized in a more favorable form from the viewpoint of the structure and manufacture.

DESCRIPTION OF EMBODIMENTS

[First Embodiment]
1-1. Basic Structure

Figure 1:
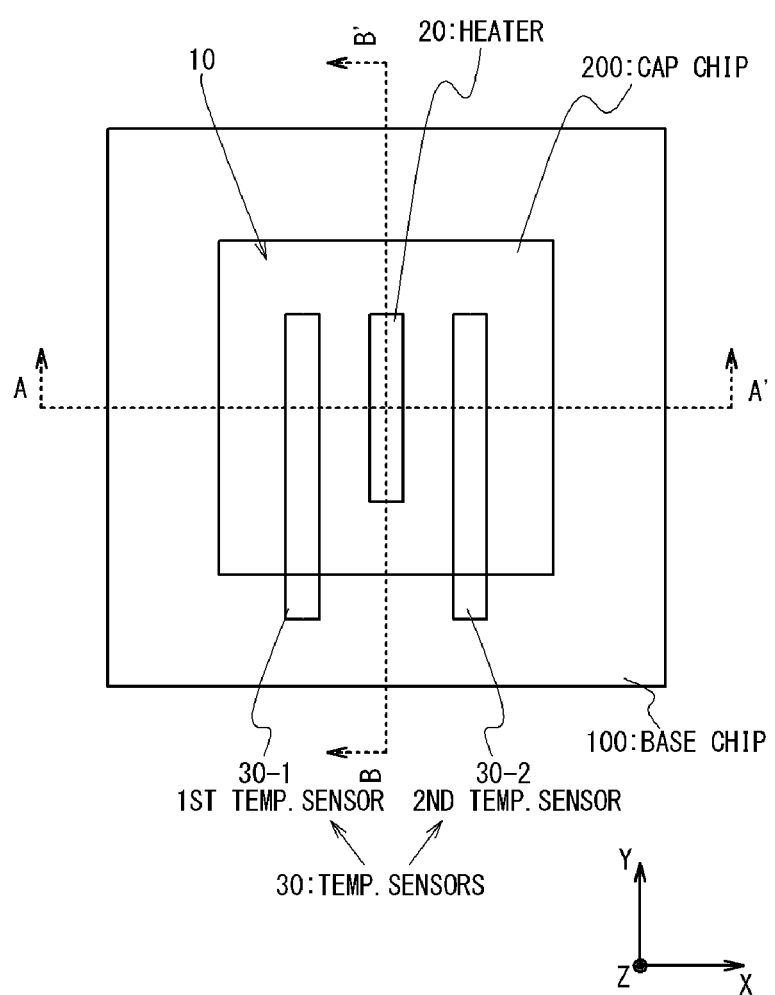
FIG. 1 is a plan view showing a structure of a semiconductor device according to a first embodiment.
Figure 2A:
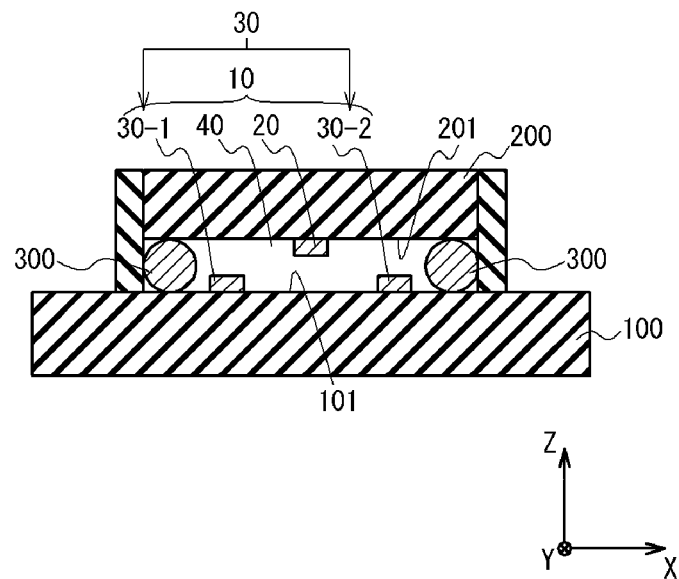
FIG. 2A is a sectional view showing a sectional structure of the semiconductor device along a line A-A' in FIG. 1.
Figure 2B:
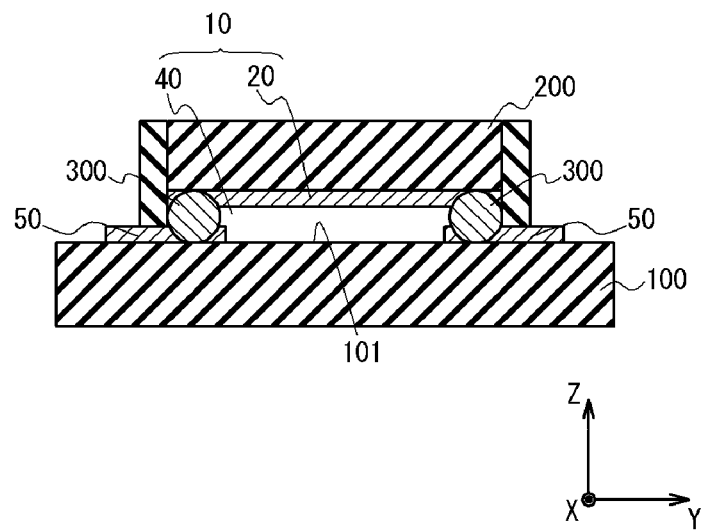
FIG. 2B is a sectional view showing a sectional structure of the semiconductor device along a line B-B' in FIG. 1.

FIG. 1 is a plan view showing a planar structure of a semiconductor device according to a first embodiment. FIG. 2A is a sectional view showing a sectional structure of the semiconductor device along a line A-A' in FIG. 1. FIG. 2B is a section view showing a sectional structure of the semiconductor device along a line B-B' in FIG. 1.

The semiconductor device according to the present embodiment includes at least two semiconductor chips which are laminated. The semiconductor chip on the underside is hereinafter referred to as "a base chip 100" and the semiconductor chip on the topside is hereinafter referred to as "a cap chip 200". The cap chip 200 is disposed on the base chip 100 to form a laminate structure. In detail, the base chip 100 and the cap chip 200 are laminated such that the surface 101 of the base chip 100 and the surface 201 of the cap chip 200 oppose to each other. In other words, the base chip 100 and the cap chip 200 are flip-connected.

It is "a connection member 300" that is used for the electric connection between the base chip 100 and the cap chip 200. Typically, the connection member 300 includes bumps (bump electrodes). In addition to electrically connecting the base chip 100 and the cap chip 200 by the connection member 300, the connection member 300 plays a role as a spacer to mechanically support the cap chip 200. In other words, the base chip 100 and the cap chip 200 are laminated through the connection member 300. In order to support the cap chip 200 stably, three or more bumps of the connection member 300 should be disposed. Also, a part of the connection member 300 may be actually "a dummy connection member" which does not contribute to the electric connection.

In the following description, the direction of the lamination of the base chip 100 and the cap chip 200 is referred to as a direction of Z. An in-plane directions orthogonal to the direction of Z are directions of X and Y. The direction of X and the direction of Y are orthogonal to each other.

The semiconductor device according to the present embodiment includes a gas type acceleration sensor 10. The gas type acceleration sensor 10 detects the acceleration of the semiconductor device by detecting a change of the temperature distribution of gas in a space 40. In detail, the gas type acceleration sensor 10 includes a heater 20, a first temperature sensor 30-1 and a second temperature sensor 30-2 as components.

The heater 20 generates heat in response to turn-on. Typically, the heater 20 is formed from a wiring of a metal such as Al and Cu. For example, as shown in FIG. 1, the metal wiring as the heater 20 is formed to extend into the Y direction. Also, as shown in FIG. 2A, in the present embodiment, the heater 20 is formed on the side of the cap chip 200. In detail, the heater 20 is formed on the surface 201 of the cap chip 200 and is exposed in the space 40.

The first temperature sensor 30-1 and the second temperature sensor 30-2 are provided to measure the temperature of gas in the space 40. Inactive gas such as nitrogen, argon, and helium or air is sealed in the space 40. Also, typically, these temperature sensors 30 are formed from metal wirings of Al and Cu. For example, as shown in FIG. 1, the metal wiring as the temperature sensor 30 is formed to extend into the Y direction. Also, as shown in FIG. 2A, in the present embodiment, the first temperature sensor 30-1 and the second temperature sensor 30-2 are formed on the side of the base chip 100. In detail, the first temperature sensor 30-1 and the second temperature sensor 30-2 are formed on the surface 101 of the base chip 100 and are exposed in the space 40.

Also, as shown in FIG. 1 and FIG. 2A, the first temperature sensor 30-1 and the second temperature sensor 30-2 are arranged on both sides of the heater 20 as a heat source. In other words, in the direction of the X, the first temperature sensor 30-1 and the second temperature sensor 30-2 are arranged to sandwich the heater 20 and to be opposite to each other. Typically, a distance between the first temperature sensor 30-1 and the heater 20 is equal to a distance between the second temperature sensor 30-2 and the heater 20. In other words, the first temperature sensor 30-1 and the second temperature sensor 30-2 are arranged in the symmetrical positions with respect to the heater 20.

Moreover, in the direction of Z, the position of the heater 20 is different from the positions of the first temperature sensor 30-1 and second temperature sensor 30-2. This is because the heater 20 is formed on the surface 201 of the cap chip 200 whereas the first temperature sensor 30-1 and the second temperature sensor 30-2 are formed on the surface 101 of the base chip 100.

Note that it is required to turn on the heater 20 for generation of heat. According to the present embodiment, as shown in FIG. 2B, the heater 20 contacts the bumps of the connection member 300 directly in two different positions. In detail, the bumps of a pair of the connection member 300 are provided to be separated in the Y direction and the both ends of the heater 20 (the metal wiring) respectively contact the bumps of the pair of the connection member 300 directly. The bumps of the pair of the connection member 300 respectively contact the wirings 50 formed on the surface 101 of the base chip 100. The wirings 50 are electrically connected with devices formed inside the base chip 100. Note that the wiring 50 are not always necessary and the connection member 300 may contact an electrode pad formed on the surface 101 of the base chip 100.

In this way, the heater 20 formed on the side of the cap chip 200 can be directly supplied with current through the connection member 300 from the base chip 100. The fact that the heater 20 on the side of the cap chip 200 directly contacts the bumps of the connection member 300 means that the heater 20 plays the role of the electrode pad. In this case, it is not necessary to form an electrode pad separately on the surface 201 of the cap chip 200 and to extend a wiring inside the cap chip 200. Therefore, the manufacture is easy and also a manufacturing cost is reduced.

Figure 2C:
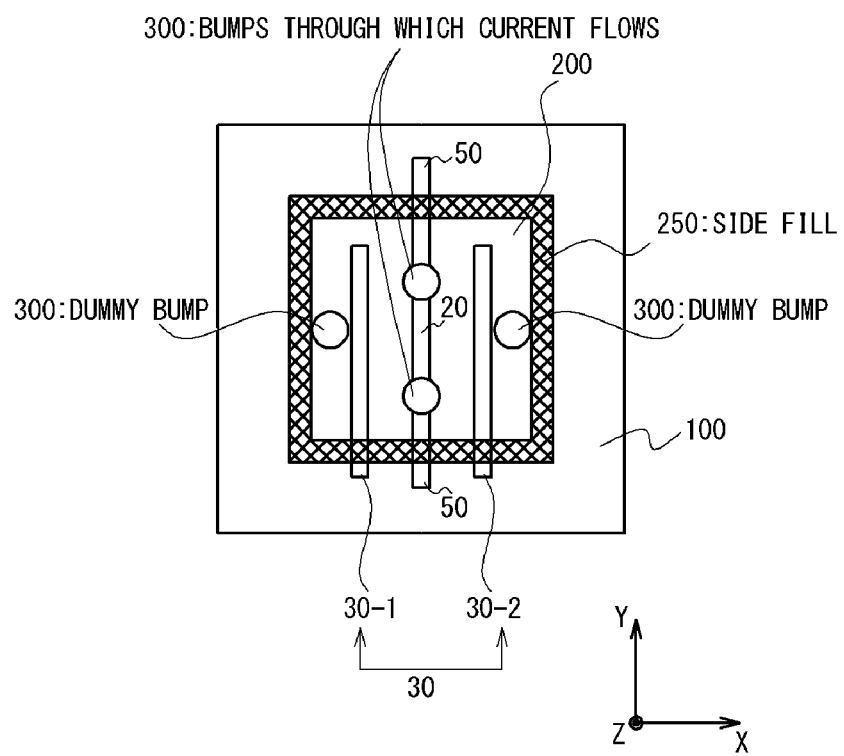
FIG. 2C is a conceptual plan view showing an example of a planar arrangement of the semiconductor device according to the first embodiment.

FIG. 2C is a plan view showing an example of a plan arrangement of the semiconductor device according to the present embodiment. A side fill 250 (ex. polyimide) is formed to surround the periphery of the cap chip 200 in FIG. 2C. The above-mentioned first temperature sensor 30-1, second temperature sensor 30-2 and wiring 50 are formed to protrude outside the side fill 250. Also, the connection member 300 (bumps) contain bumps to pass the current, and bumps which do not contribute to the electric connection. Note that three or more bumps are provided as the connection member 300 (bumps) to support the cap chip 200 stably.

1-2. Operation and Effect

Figure 3:
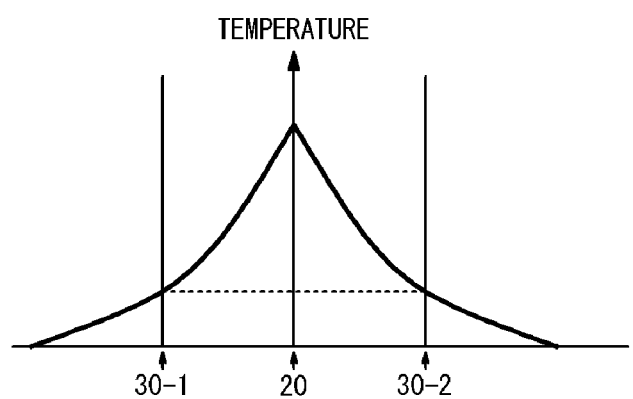
FIG. 3 is a diagram showing an operation of the semiconductor device according to the first embodiment.

FIG. 3 shows a temperature distribution in a state (ex. a stationary state) that the acceleration is not applied to the semiconductor device. The vertical axis shows a temperature and the horizontal axis shows a position in the direction of the X. In this state, the symmetrical temperature distribution is formed to be centered on the position of the heater 20.

Figure 4A:
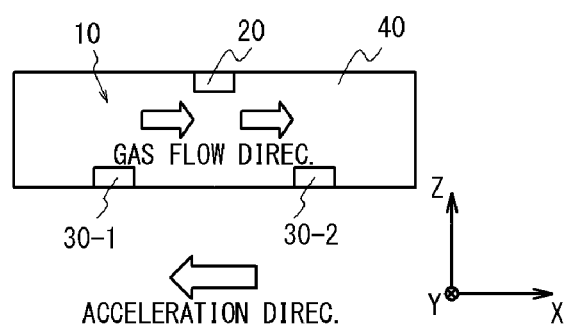
FIG. 4A is a diagram showing an operation of the semiconductor device according to the first embodiment.
Figure 4B:
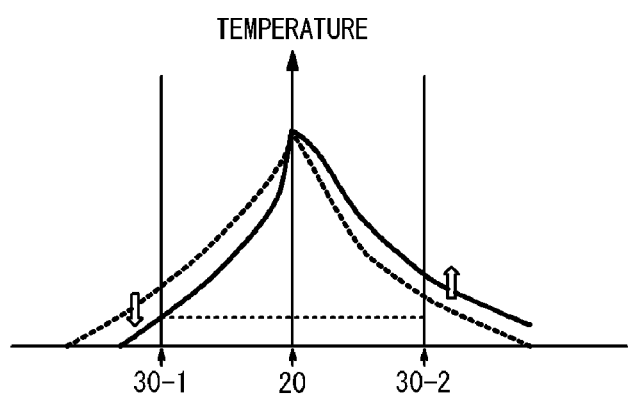
FIG. 4B is a diagram showing the operation of the semiconductor device according to the first embodiment.

FIG. 4A conceptually shows the state that "an acceleration to the −X direction" is applied to the semiconductor device. FIG. 4B shows a temperature distribution in the state shown in FIG. 4A. In this case, the gas in the space 40 cannot follow the movement of the semiconductor device. Therefore, in the space 40, the flow of gas (relative movement) occurs in a direction (+X direction) opposite to the direction A of the acceleration (−X direction). Because there is a hot gas flow to the +X direction in the space 40, the temperature distribution is biased to the +X direction. As a result, the temperature rises in the position of the second temperature sensor 30-2 and contrarily, the temperature declines in the position of the first temperature sensor 30-1. By using the first temperature sensor 30-1 and the second temperature sensor 30-2, a pattern of such a temperature change can be detected. Saying oppositely, "the acceleration to the −X direction" can be detected through the detection of the pattern of such a temperature change.

When "the acceleration to the +X direction" is applied to the semiconductor device, the detected pattern of the temperature change becomes contrary to the pattern shown in FIG. 4B. Therefore, "the acceleration to the −X direction" and "the acceleration to the +X direction" can be distinguished.

Figure 5A:
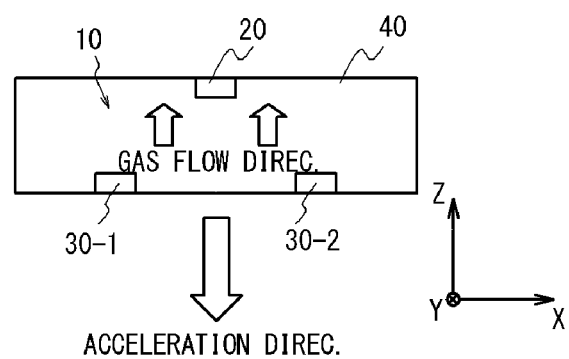
FIG. 5A is a diagram showing an operation of the semiconductor device according to the first embodiment.
Figure 5B:
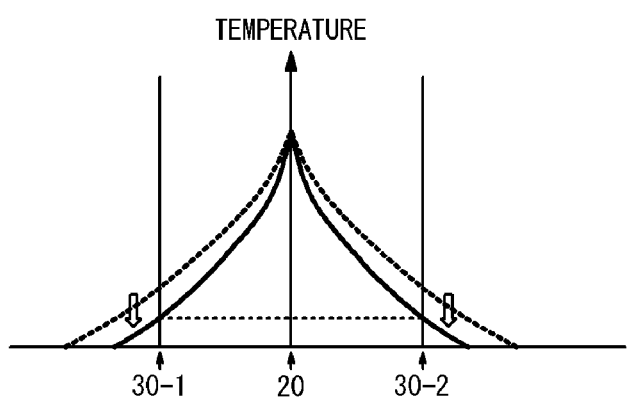
FIG. 5B is a diagram showing the operation of the semiconductor device according to the first embodiment.

FIG. 5A is a diagram conceptually showing the state that "the acceleration to the −Z direction" is applied to the semiconductor device. FIG. 5B is a diagram showing a temperature distribution in the condition shown in FIG. 5A. In this case, the gas in the space 40 cannot follow the movement of the semiconductor device. Therefore, in the space 40, a flow of gas (a relative movement) occurs in a direction (the +Z direction) opposite to the acceleration direction A (the −Z direction). Because the hot gas flows to the +Z direction in the space 40, the temperature distribution is biased to the +Z direction. As a result, the temperatures decline in positions of both of the first temperature sensor 30-1 and the second temperature sensor 30-2. By using the first temperature sensor 30-1 and the second temperature sensor 30-2, a pattern of such a temperature change can be detected. Saying oppositely, "the acceleration to the −Z direction" can be detected through the detection of the pattern of such a temperature change.

When "the acceleration to the +Z direction" is applied to the semiconductor device, the pattern of the detected temperature change becomes contrary to the pattern shown in FIG. 5B. Therefore, "the acceleration to the −Z direction" and "the acceleration to the +Z direction" can be distinguished.

In this way, according to the gas type acceleration sensor 10 of the present embodiment, the accelerations to the X direction and the Z direction can be detected in the simple structure. The reason why the acceleration to the X direction can be detected is in that the first temperature sensor 30-1 and the second temperature sensor 30-2 are arranged on both sides of the heater 20 in the X direction. The reason why the acceleration to the Z direction can be detected is in that the position of the heater 20 is different from the positions of the first temperature sensor 30-1 and the second temperature sensor 30-2 in the Z direction.

Moreover, according to the present embodiment, the heater 20 on the side of the cap chip 200 contacts the connection member 300 directly. This means that the heater 20 plays a role of an electrode pad. In this case, it is not necessary to form an electrode pad separately on the surface 201 of the cap chip 200 and to elongate a wiring line inside the cap chip 200. Therefore, the manufacture becomes easy and also a manufacturing cost is reduced.

1-3. Structure Example

Figure 6:
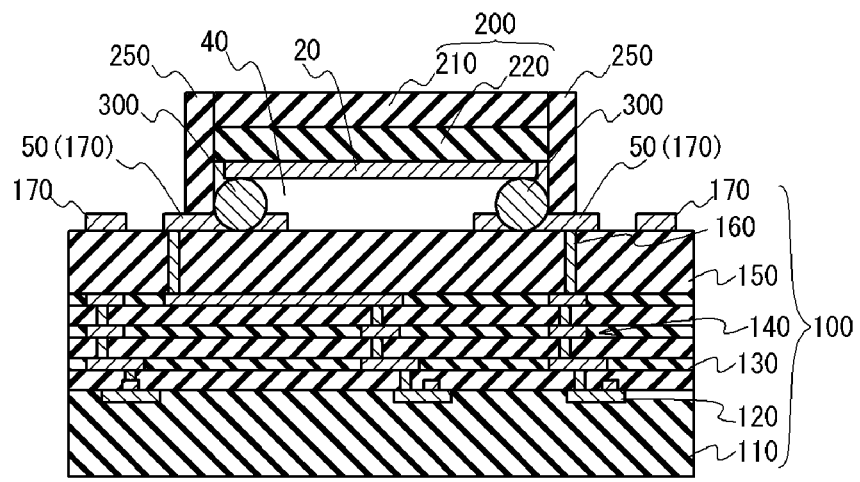
FIG. 6 is a sectional view showing an example of the sectional structure of the semiconductor device according to the first embodiment.
Figure 6:
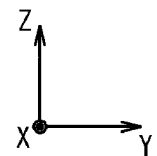

FIG. 6 shows an example of the structure of the semiconductor device according to the present embodiment.

A transistor 120 is formed on a silicon substrate 110 in the base chip 100. An insulating film 130 is formed to cover the silicon substrate 110 and the transistor 120, and a multi-layer wiring layer 140 is formed in the insulating film 130 to be connected with the transistor 120. Moreover, an insulating film 150 is formed on the insulating film 130 and a via-contact 160 is formed in the insulating film 150 to be connected with the multi-layer wiring layer 140. Moreover, an uppermost wiring layer 170 is formed on the insulating film 150 to be connected with the via-contact 160. The uppermost wiring layer 170 contains a temperature sensor 30, wirings 50, electrode pads and so on. For example, the uppermost wiring layer 170 is formed of Al.

An insulating film 220 is formed on the silicon substrate 210 in the cap chip 200. A metal wiring (ex. Al) is formed on the insulating film 220 to function as the heater 20. Note that the number of insulating layers on the above-mentioned base chip 100 is more than the number of insulating layers on the cap chip 200.

Bumps (bump electrodes) are formed as the connection member 300 between the base chip 100 and the cap chip 200. The bumps 300 electrically connect the base chip 100 and the cap chip 200, and in addition, functions as a spacer to mechanically support the cap chip 200. Also, in the present embodiment, as mentioned above, the heater 20 formed on the side of the cap chip 200 contacts the bumps 300 directly. In other words, the heater 20 functions as the electrode pad. The heater 20 can be supplied with DC current through the bumps 300.

Moreover, a side fill 250 (ex. polyimide) is formed to surround the periphery of the cap chip 200. Thus, the space 40 is formed which is surrounded by the base chip 100, the cap chip 200 and the side fill 250. The gas is sealed in the space 40. By detecting a change of the temperature distribution of the gas in the space 40, the gas type acceleration sensor 10 detects the acceleration of the semiconductor device.

Note that the transistor 120 is formed in the base chip 100 in an example shown in FIG. 6, but a transistor is not formed in the cap chip 200. This is because the heater 20 contacts the bumps 300 directly so that ON/OFF of the heater 20 can be controlled from the side of the base chip 100. The transistor and the multi-layer wiring layer, which are used to control ON/OFF of the heater 20, are not required to form in the cap chip 200. Therefore, the manufacturing cost is reduced.

Also, when the transistor is not formed in the cap chip 200, it is not necessary to use the silicon substrate 210 of the cap chip 200 which is high in quality and expensive. In other words, the quality of the silicon substrate 210 of the cap chip 200 may be lower than the quality of the silicon substrate 110 of the base chip 100 on which the transistor 120 is formed. This contributes to reduction of the manufacturing cost.

One index of the quality of the silicon substrate (semiconductor substrate) is "a defect density". The silicon substrate having a lower defect density is higher in quality. In an example shown in FIG. 6, the defect density of the silicon substrate 210 of the cap chip 200 may be higher than the defect density of the silicon substrate 110 of the base chip 100. Note that a method of measuring the defects in the substrate (wafer) surface is typically a light scattering method. According to the light scattering method, a convergence laser beam with the wavelength of 400 to 700 nm is irradiated to the substrate (wafer) surface. Then, the laser beam scattered with the defects is detected by a light receiving unit. The defect density can be determined based on the detection frequency and detection state of the scattered laser beam.

Note that it is desirable in the following points that the heater 20 as a heat source is formed on the cap chip 200 on the upper side. First, the heat radiation from the uppermost silicon substrate 210 in an upper direction can be expected. Also, the influence of the heat of the heater 20 on the operation of the transistor 120 can be suppressed, because the position of the heater 20 is far from the transistor 120 formed in the base chip 100.

Figure 7:
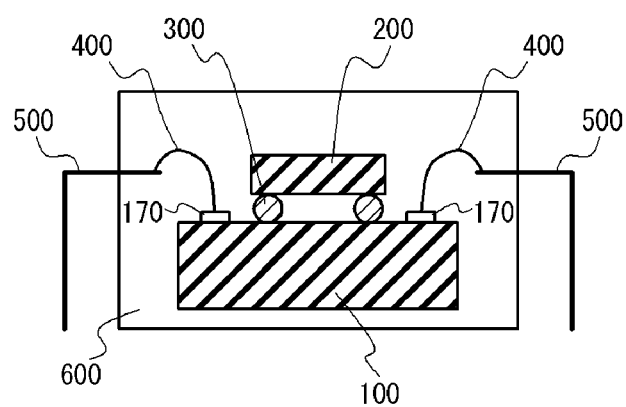
FIG. 7 is a conceptual diagram showing an example of a package structure of the semiconductor device according to the first embodiment.
Figure 8:
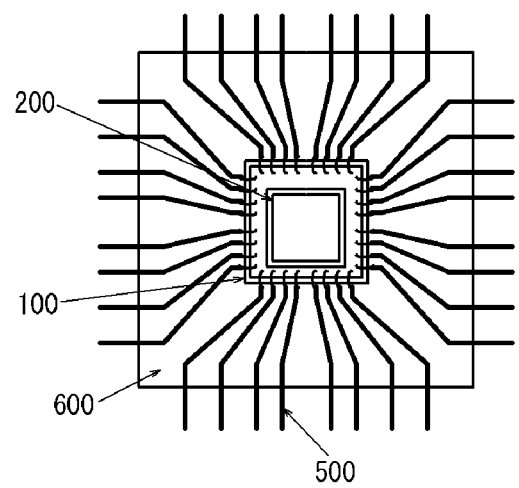
FIG. 8 is a conceptual diagram showing an example of the package structure of the semiconductor device according to the first embodiment.

FIG. 7 and FIG. 8 are diagrams showing QFP (Quad Flat Package) as an example of the package structure of the semiconductor device according to the present embodiment. The electrode pads (part of uppermost wiring layer 170) on the surface of the base chip 100 are connected with leads 500 through bonding wires 400. Moreover, the semiconductor device is sealed with mold resin 600.

1-4. Manufacturing Method

FIG. 9A to FIG. 9L are sectional views showing an example of the method of manufacturing the semiconductor device according to the present embodiment.

Figure 9A:
FIG. 9A is a sectional view showing an example of a manufacturing method of the semiconductor device according to the first embodiment.

First, as shown in FIG. 9A, a laminate structure of the silicon substrate 110 of the base chip 100, the insulating film 130 and the insulating film 150 is formed. As mentioned above, the transistor 120 (not illustrated) is formed on the silicon substrate 110. The multi-layer wiring layer 140 (not illustrated) is formed in the insulating film 130. The via-contact 160 (not illustrated) is formed in the insulating film 150.

Figure 9B:
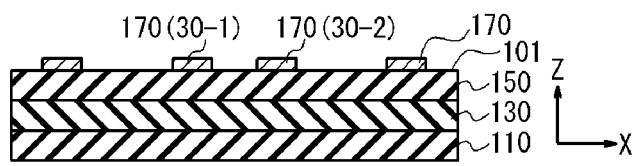
FIG. 9B is a sectional view showing an example of a method of manufacturing the semiconductor device according to the first embodiment.

Next, as shown in FIG. 9B, the uppermost wiring layer 170 is formed on the surface of the insulating film 150. The uppermost wiring layer 170 contains the temperature sensors 30, the wirings 50, electrode pads and so on. For example, the uppermost wiring layer 170 is formed of Al.

Figure 9C:
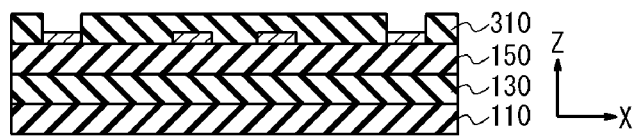
FIG. 9C is a sectional view showing an example of the method of manufacturing the semiconductor device according to the first embodiment.

Next, as shown in FIG. 9C, a resist film 310 is formed to cover the insulating film 150 and the uppermost wiring layer 170. Moreover, openings are formed in the positions where the bumps 300 are formed later.

Figure 9D:
FIG. 9D is a sectional view showing an example of the method of manufacturing the semiconductor device according to the first embodiment.

Next, as shown in FIG. 9D, a Cu plating layer 180 is formed on the uppermost wiring layer 170 in the above-mentioned openings.

Figure 9E:
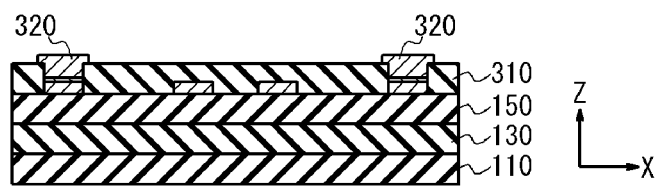
FIG. 9E is a sectional view showing an example of the method of manufacturing the semiconductor device according to the first embodiment.

Next, as shown in FIG. 9E, solders 320 are formed to bury the above-mentioned openings. For example, the solder 320 is a Sn alloy.

Figure 9F:
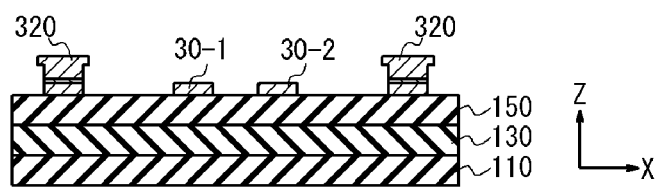
FIG. 9F is a sectional view showing an example of the method of manufacturing the semiconductor device according to the first embodiment.

Next, as shown in FIG. 9F, the resist film 310 is removed.

Figure 9G:
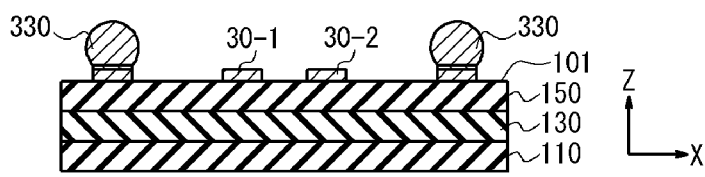
FIG. 9G is a sectional view showing an example of the method of manufacturing the semiconductor device according to the first embodiment.

Next, solder reflow is carried out. As a result, as shown in FIG. 9G, spherical solders 330 are formed.

Figure 9H:
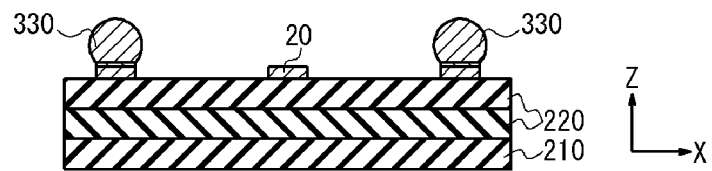
FIG. 9H is a sectional view showing an example of the method of manufacturing the semiconductor device according to the first embodiment.

The cap chip 200 is formed in the same way as the base chip 100. As shown in FIG. 9H, the insulating film 220 is formed on the silicon substrate 210. Then, the metal wiring (ex. Al) is formed on the surface of the insulating film 220 to function as the heater 20. Spherical solders 330 are formed on the insulating film 220 in the same method as in the base chip 100. Note that any transistor is not formed on the silicon substrate 210.

Figure 9I:
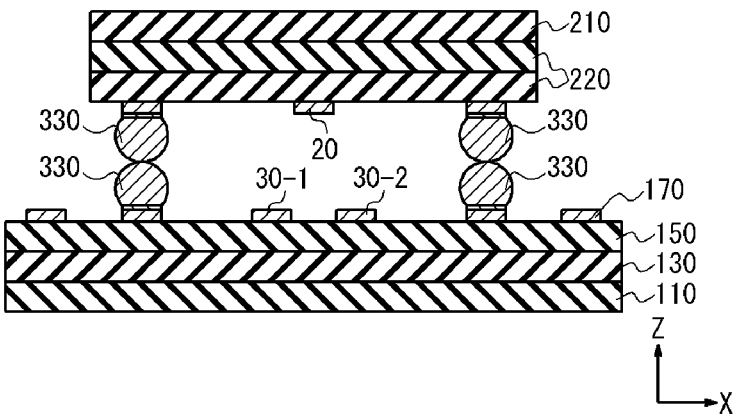
FIG. 9I is a sectional view showing an example of the method of manufacturing the semiconductor device according to the first embodiment.

Next, as shown in FIG. 9I, the base chip 100 and the cap chip 200 are superposed or laminated so as to oppose the surfaces to each other. At this time, the superposition is carried out such that spherical solders 330 on the side of the base chip 100 and the spherical solders 330 on the side of the cap chip 200 contact each other. In other words, the base chip 100 and the cap chip 200 are formed so that the distribution positions of the spherical solders 330 coincide with each other and they are superposed so that the spherical solders 330 are in contact with each other.

Figure 9J:
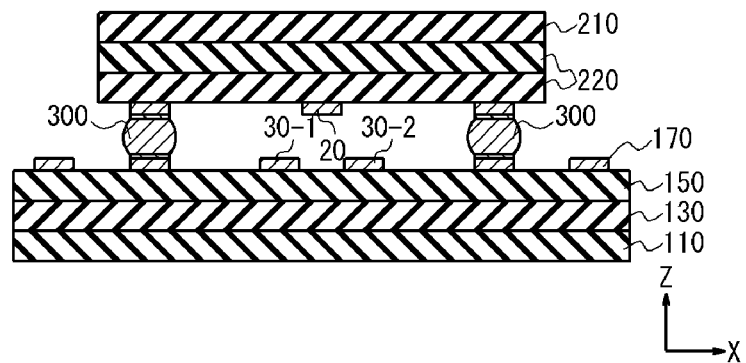
FIG. 9J is a sectional view showing an example of the method of manufacturing the semiconductor device according to the first embodiment.

Next, the solder reflow is carried out. As a result, as shown in FIG. 9J, the two spherical solders 330 are mixed with each other to form the bump 300. In this way, the base chip 100 and the cap chip 200 are flip-connected through the bumps 300.

Note that as shown in FIG. 9J, the first temperature sensor 30-1 and the second temperature sensor 30-2 are arranged so as to oppose to each other through the heater 20 in the X direction. Also, the position of the heater 20 in the Z direction is different from the position of the first temperature sensor 30-1 and that of the second temperature sensor 30-2. Moreover, although not illustrated, the heater 20 formed in the cap chip 200 contacts the bumps 300 directly.

Figure 9K:
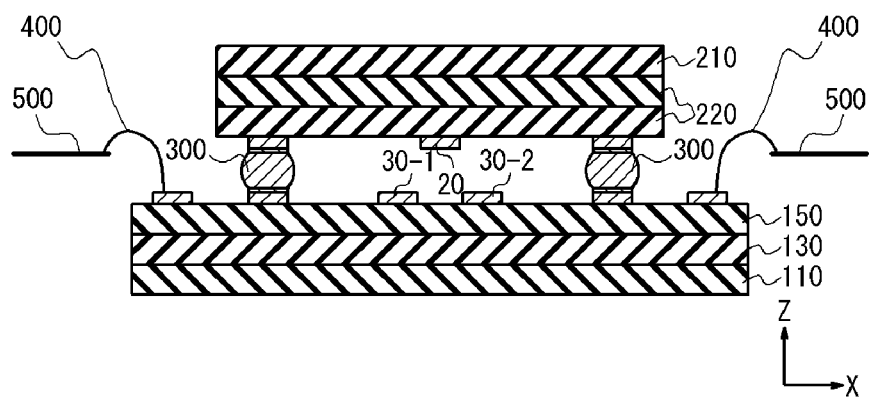
FIG. 9K is a sectional view showing an example of the method of manufacturing the semiconductor device according to the first embodiment.

After that, the superposition structure of the base chip 100 and the cap chip 200 is mounted on a lead frame. As shown in FIG. 9K, electrode pads (a part of uppermost wiring layer 170) on the surface of the base chip 100 are connected with the leads 500 through the bonding wires 400.

Figure 9L:
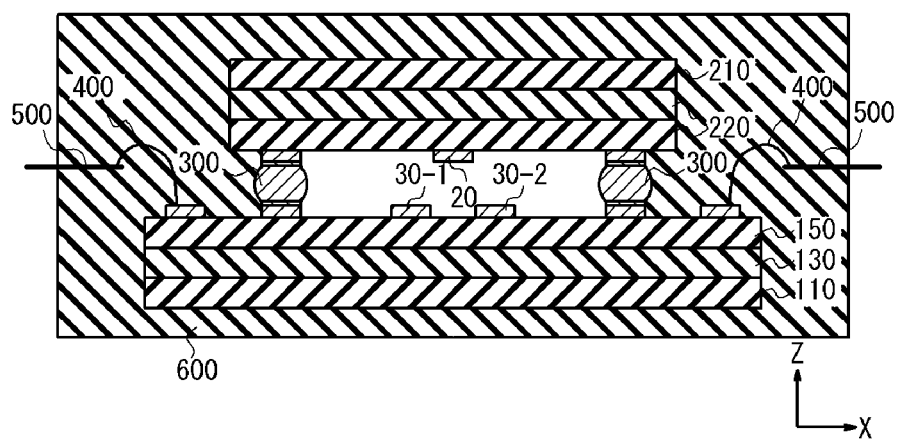
FIG. 9L is a sectional view showing an example of the method of manufacturing the semiconductor device according to the first embodiment.

Moreover, as shown in FIG. 9L, a semiconductor device is sealed with mold resin 600. At this time, the invasion of mold resin 600 is prevented by the bumps 300. Also, the space 40 is sealed with the mold resin 600 under the atmosphere of an inactive gas such as nitrogen, argon, and helium or an air atmosphere. Thus, the space 40 of the gas type acceleration sensor 10 is formed. In other words, the mold resin 600 functions as the side fill 250 shown in FIG. 6.

The method of forming the side fill 250 is not limited to the above method. A modification will be described with reference to FIG. 10A to FIG. 10D.

Figure 10A:
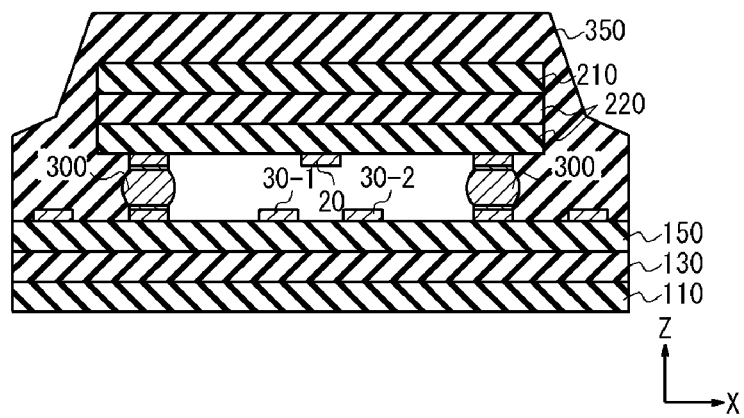
FIG. 10A is a sectional view showing another example of the method of manufacturing the semiconductor device according to the first embodiment.

After the structure shown in FIG. 9J mentioned above is obtained, polyimide 350 is applied as shown in FIG. 10A. The polyimide 350 is photosensitive. At this time, the invasion of polyimide 350 is prevented by the bumps 300. Also, in case of polyimide application, the gas is injected into the space 40 by applying the polyimide under the atmosphere of inactive gas such as nitrogen, argon, and helium under the air atmosphere. Thus, the space 40 of the gas type acceleration sensor 10 is formed.

Figure 10B:
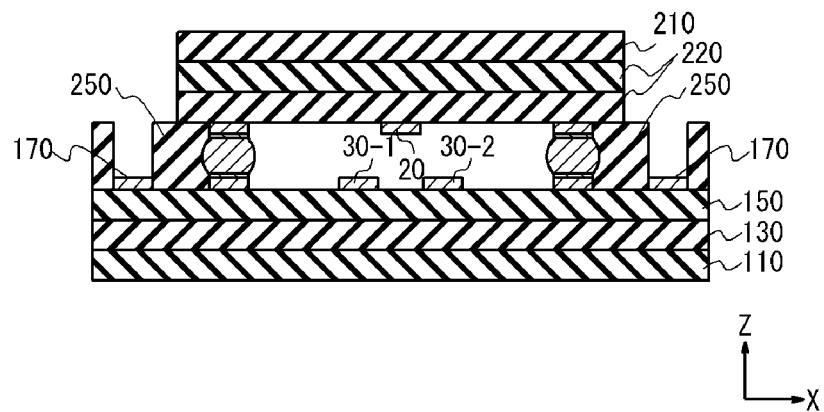
FIG. 10B is a sectional view showing the other example of the method of manufacturing the semiconductor device according to the first embodiment.

Next, as shown in FIG. 10B, the polyimide 350 is partially removed through the light exposure. Specifically, parts of the polyimide 350 corresponding to a portion of electrode pads on the surface of the base chip 100 are removed. Also, at this time, the polyimide 350 on the silicon substrate 210 of the cap chip 200 is removed. The polyimide 350 left after the removal in this way forms the side fill 250 shown in FIG. 6.

Figure 10C:
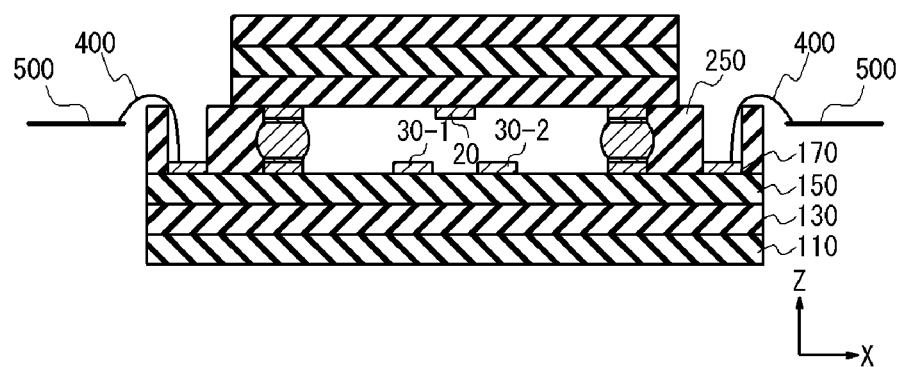
FIG. 10C is a sectional view showing the other example of the method of manufacturing the semiconductor device according to the first embodiment.

After that, the lamination structure of the base chip 100 and the cap chip 200 is mounted onto a lead frame. Then, as shown in FIG. 10C, the electrode pads (a part of uppermost wiring layer 170) on the surface of the base chip 100 are connected with leads 500 through the bonding wires 400.

Figure 10D:
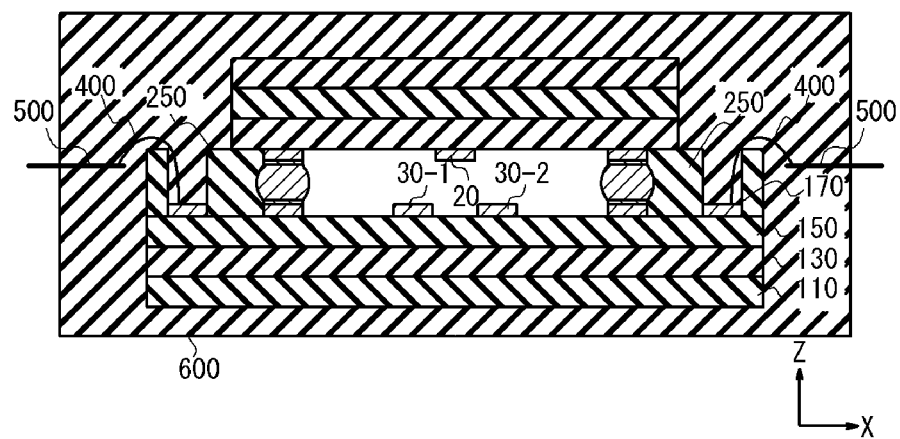
FIG. 10D is a sectional view showing the other example of the method of manufacturing the semiconductor device according to the first embodiment.

Moreover, as shown in FIG. 10D, a semiconductor device is sealed with the mold resin 600.

[Second Embodiment]

In the above-mentioned first embodiment, the heater 20 was formed on or above the cap chip 200 and the temperature sensors 30 were formed under or below the base chip 100. The relation may be opposite. That is, the heater 20 may be formed under or below the base chip 100 and the temperature sensors 30 may be formed on or above the cap chip 200. In the second embodiment, this case will be described. Note that the description which overlaps the description of the first embodiment is appropriately omitted.

Figure 11:
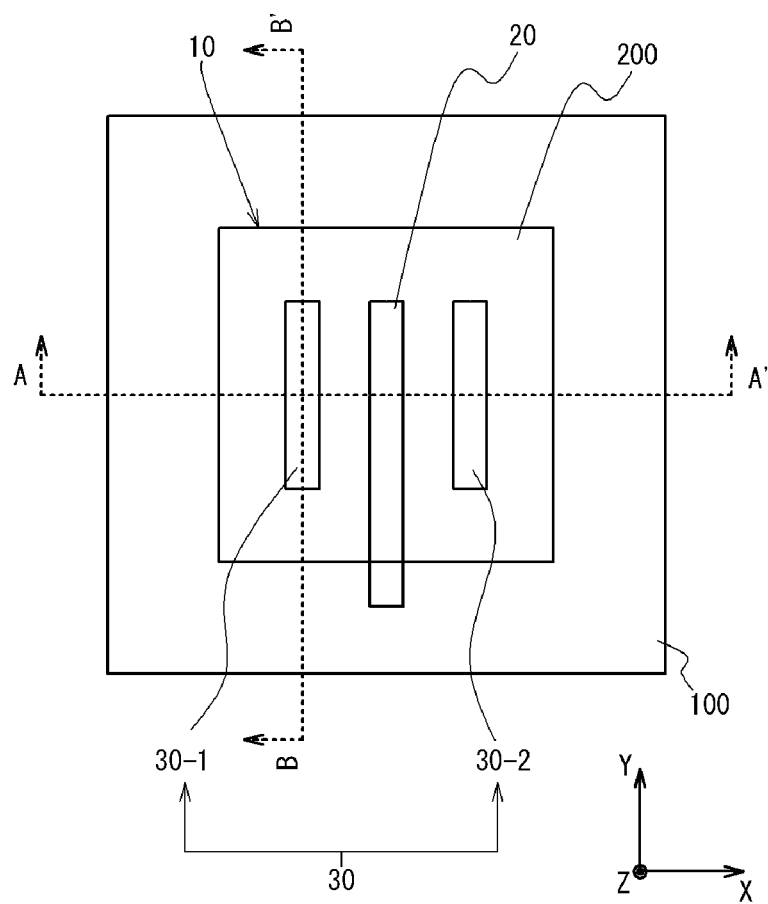
FIG. 11 is a plan view showing the structure of the semiconductor device according to a second embodiment.
Figure 12A:
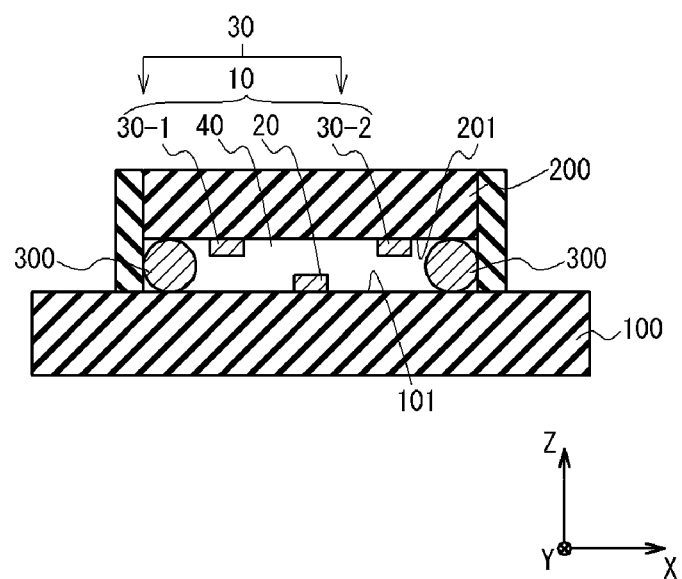
FIG. 12A is a sectional view showing a sectional structure of the semiconductor device along a line A-A' in FIG. 11.
Figure 12B:
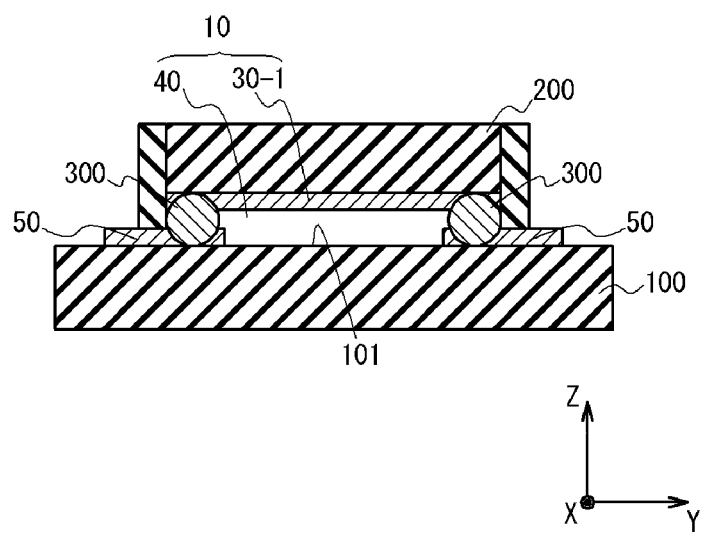
FIG. 12B is a sectional view showing a sectional structure of the semiconductor device along a line B-B' in FIG. 11.

FIG. 11 is a plan view showing the structure of the semiconductor device according to the second embodiment. FIG. 12A is a sectional view showing the section structure of the semiconductor device along a line A-A' in FIG. 11. FIG. 12B is a sectional view showing the section structure of the semiconductor device along a line B-B' in FIG. 11.

As shown in FIG. 12A, the heater 20 is formed on the surface 101 of the base chip 100 and is exposed in the space 40. On the other hand, the first temperature sensor 30-1 and the second temperature sensor 30-2 are formed on the surface 201 of the cap chip 200 and are exposed in the space 40. In the X direction, the first temperature sensor 30-1 and the second temperature sensor 30-2 are arranged to sandwich the heater 20 between them and to oppose to each other. Also, in the Z direction, the position of the heater 20 is different from the positions of the first temperature sensor 30-1 and the second temperature sensor 30-2.

Also, as shown in FIG. 12B, the first temperature sensor 30-1 formed on the cap chip 200 contacts the bumps 300 of the connection member directly. In detail, a couple of bumps 300 of the connection member are provided to be separated in the Y direction and are provided to respectively and directly contact the both ends of the first temperature sensor 30-1 (metal wiring). The second temperature sensor 30-2 is same.

In this way, a signal can be directly sent through the bump 300 of the connection member to the temperature sensor 30 formed on the side of the cap chip 200 from the base chip 100. The fact that temperature sensors 30 on the side of the cap chip 200 directly contact the bumps 300 of the connection member means that the temperature sensors 30 play the role of the electrode pads. In this case, it is not necessary to form the electrode pad separately on the surface 201 of the cap chip 200 and to arrange to elongate the wiring inside the cap chip 200. Therefore, the manufacture becomes easy and also a manufacturing cost can be reduced.

Also, in the cap chip 200, it is not necessary to form transistors for controlling the temperature sensors 30 and the multi-layer wiring layer. Therefore, the manufacturing cost can be reduced. Also, when the transistors are not formed in the cap chip 200, it is not necessary to use a high-quality and expensive silicon substrate for the silicon substrate 210 of the cap chip 200. In other words, the quality of the silicon substrate 210 of the cap chip 200 may be lower than the quality of the silicon substrate 110 of the base chip 100 in which the transistor 120 is formed. This contributes to reduction of the manufacturing cost.

The detection of the acceleration in the present embodiment is same as in the first embodiment. Even in the structure according to the present embodiment, the accelerations of the two directions of the X direction and the Z direction can be detected.

[Third Embodiment]

Figure 13:
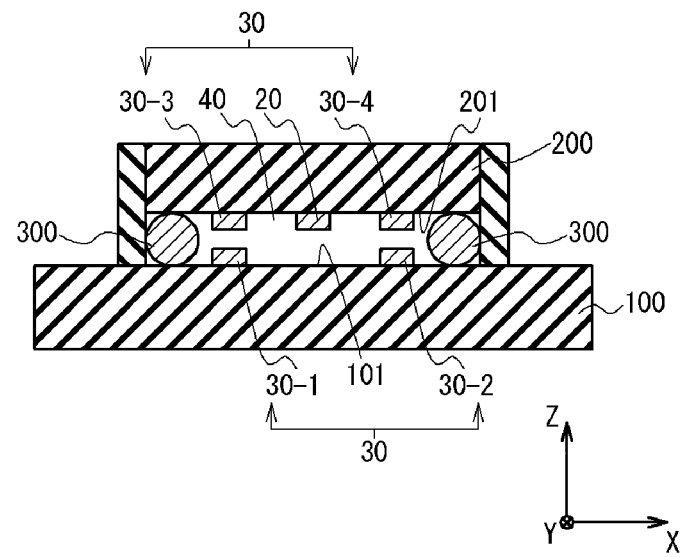
FIG. 13 is a sectional view showing a sectional structure of the semiconductor device according to a third embodiment.

FIG. 13 shows the structure of the semiconductor device according to a third embodiment. Moreover, the gas type acceleration sensor 10 includes a third temperature sensor 30-3 and a fourth temperature sensor 30-4, with the comparison to the first embodiment (reference to FIG. 2A). Note that the description which overlaps that of the first embodiment is appropriately omitted.

The first temperature sensor 30-1 and the second temperature sensor 30-2 are formed on the side of the base chip 100, whereas the third temperature sensor 30-3 and the fourth temperature sensor 30-4 are formed on the side of the cap chip 200. In detail, the third temperature sensor 30-3 and the fourth temperature sensor 30-4 are formed on the surface 201 of the cap chip 200 and are exposed in the space 40.

In the X direction, the third temperature sensor 30-3 and the fourth temperature sensor 30-4 are arranged to sandwich the heater 20 and to oppose to each other. Typically, a distance between the third temperature sensor 30-3 and the heater 20 is equal to a distance between the fourth temperature sensor 30-4 and the heater 20. In other words, the third temperature sensor 30-3 and the fourth temperature sensor 30-4 are arranged in the symmetrical positions with respect to the heater 20. Also, the positions of the first temperature sensor 30-1 and the third temperature sensor 30-3 to the X direction may be same and also the positions of the second temperature sensor 30-2 and the fourth temperature sensor 30-4 may be same. In other words, the first temperature sensor 30-1 and the third temperature sensor 30-3 may oppose to each other and also the second temperature sensor 30-2 and the fourth temperature sensor 30-4 may oppose to each other.

Also, it is desirable that the third temperature sensors 30-3 and the fourth temperature sensors 30-4 are formed to contact the connection members 300 directly, like the case of the heater 20.

Figure 14:
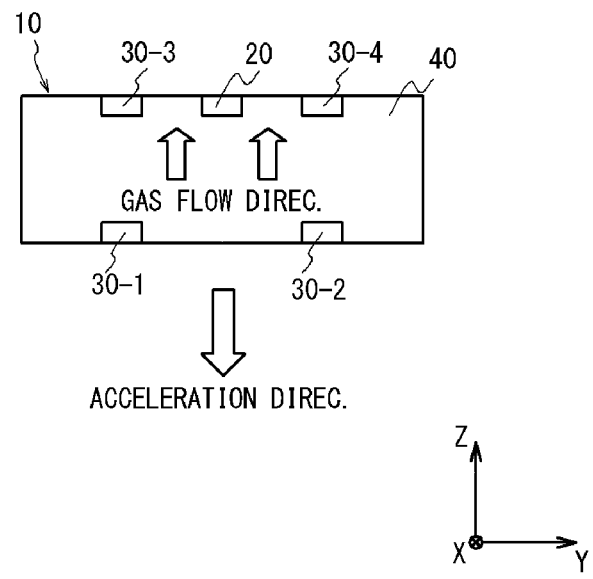
FIG. 14 is a diagram showing an operation of the semiconductor device according to the third embodiment.

FIG. 14 shows the state that "the acceleration to the −Z direction" is applied to the semiconductor device. In this case, the gas in the space 40 cannot follow the movement of the semiconductor device. Therefore, in the space 40, a flow of gas (the relative movement of gas) occurs in the direction (the +Z direction) opposite to the direction of the acceleration A (the −Z direction). As a result, the temperature declines in the positions of both of the first temperature sensor 30-1 and the second temperature sensor 30-2. On the other hand, in the positions of both of the third temperature sensor 30-3 and the fourth temperature sensor 30-4, the temperature rises. "The acceleration to the −Z direction" can be detected through the detection of a pattern of such a temperature change.

Especially, in the present embodiment, it becomes possible to detect the pattern of the temperature change more clearly by calculating a difference between the measurement temperatures of the first temperature sensor 30-1 (the second temperature sensor 30-2) and the third temperature sensor 30-3 (the fourth temperature sensor 30-4). The sensitivity and precision of the gas type acceleration sensor 10 can be improved by adopting a method which is based on the difference not an absolute value. For example, even if an offset value changes due to the change of the peripheral environment, the correct acceleration can be detected by adopting a method which is based on the difference.

Note that a combination of the second embodiment and the third embodiment is possible.

[Fourth Embodiment]

Figure 15:
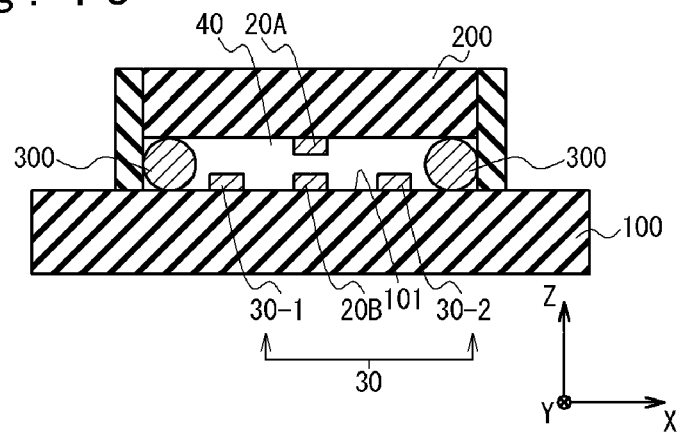
FIG. 15 is a sectional view showing the sectional structure of the semiconductor device according to a fourth embodiment.

FIG. 15 is a sectional view showing the structure of the semiconductor device according to a fourth embodiment. The gas type acceleration sensor 10 includes two heaters 20 (first heater 20A and second heater 20B) as compared with the first embodiment (reference to FIG. 2A). Note that the description which overlaps that of the first embodiment is appropriately omitted.

The first heater 20A is formed on the side of the cap chip 200 and is the same as the heater 20 of the first embodiment.

On the other hand, the second heater 20B is formed on the side of the base chip 100. In detail, the second heater 20B is formed on surface 101 of the base chip 100 and is exposed in the space 40. In the X direction, the first temperature sensor 30-1 and the second temperature sensor 30-2 are arranged to sandwich the second heater 20B and to oppose to each other.

Also, the first heater 20A and the second heater 20B may be provided to oppose to each other.

Figure 16:
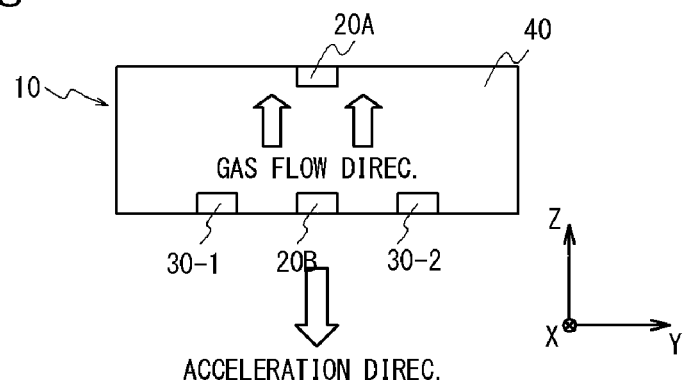
FIG. 16 is a diagram showing an operation of the semiconductor device according to the fourth embodiment.

FIG. 16 is a conceptual diagram showing the state that "the acceleration to the −Z direction" is applied to the semiconductor device. In this case, the gas in the space 40 cannot follow the movement of the semiconductor device. Therefore, in the space 40, the flow of gas (the relative movement of gas) occurs in the direction (the +Z direction) opposite to the direction A of the acceleration (the −Z direction).

Figure 17:
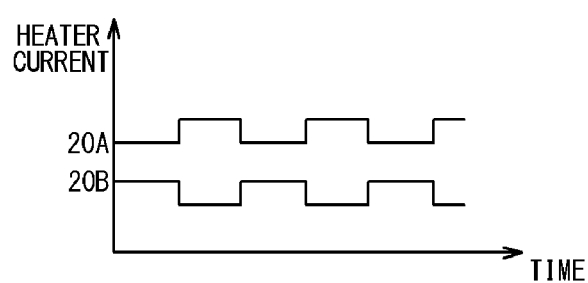
FIG. 17 is a diagram showing the operation of the semiconductor device according to the fourth embodiment.

In the present embodiment, as shown in FIG. 17, the first heater 20A and the second heater 20B are alternately turned on. In other words, when the first heater 20A is in the turned-on state, the second heater 20B is in the turned-off state, and when the first heater 20A is in the turned-off state, the second heater 20B is in the turned-on state. Because the first heater 20A is in the position left from the temperature sensors 30, when the first heater 20A is the on state, the temperature change is great which is detected by the temperature sensors 30 when the acceleration to the Z direction is applied. On the other hand, because the second heater 20B is at the just side of the temperature sensors 30, when the second heater 20B is in on state, the temperature change is small which is detected by the temperature sensor 30 when the acceleration to the Z direction is applied.

Therefore, the pattern of the temperature changes can be detected more clearly by calculating a difference between the measurement temperatures in case of both of the on states. The sensitivity and precision of the gas type acceleration sensor 10 can be improved by adopting a method that is based on the difference not an absolute value. For example, this method which is based on the difference makes the correct acceleration detection possible, even if the change of the peripheral environment changes an offset value.

Note that the present embodiment may be combined with the above-mentioned embodiments in the range of no contradiction.

[Fifth Embodiment]

In the fifth embodiment, a plurality of gas type acceleration sensors 10 are provided for the semiconductor device. It is assumed that two gas type acceleration sensors 10 (first gas type acceleration sensor 10-1 and second gas type acceleration sensor 10-2) are provided as an example. Note that the description which overlaps that of the first embodiment is appropriately omitted.

Figure 18:
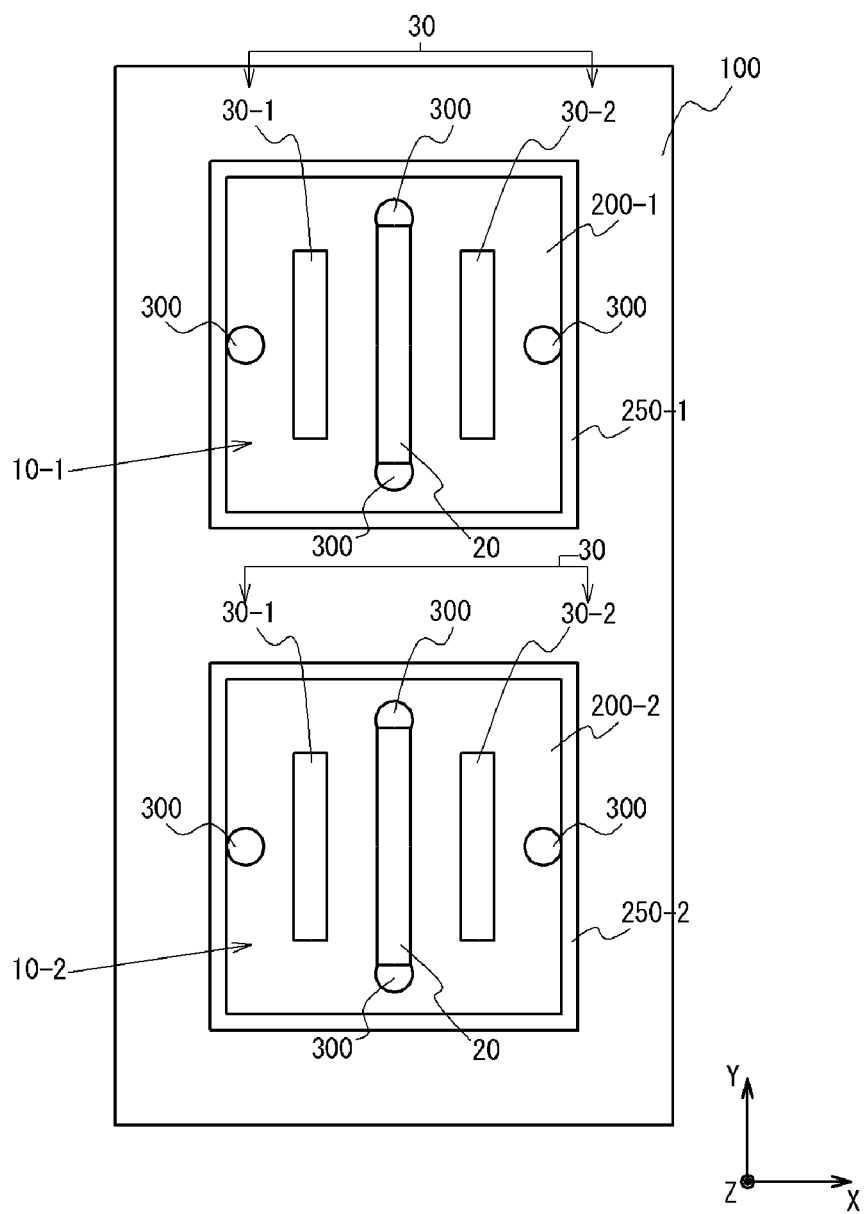
FIG. 18 is a plan view showing a planar structure of the semiconductor device according to a fifth embodiment.

As shown in FIG. 18, two cap chips 200 (first cap chip 200-1 and second cap chip 200-2) are mounted onto the single base chip 100. The first cap chip 200-1 is surrounded with a side fill 250-1 and the second cap chip 200-2 is surrounded with a side fill 250-2. The first cap chip 200-1 and the second cap chip 200-2 correspond to the first gas type acceleration sensor 10-1 and the second gas type acceleration sensor 10-2, respectively.

In detail, the heater 20 of the first gas type acceleration sensor 10-1 is formed in the first cap chip 200-1. On the other hand, the heater 20 of the second gas type acceleration sensor 10-2 is formed in the second cap chip 200-2. The temperature sensors 30 of the first gas type acceleration sensor 10-1 and the temperature sensors 30 of the second gas type acceleration sensor 10-2 are formed on the single base chip 100. The operation of each of the first gas type acceleration sensors 10-1 and the second gas type acceleration sensors 10-2 is the same as that of the first embodiment.

In an example shown in FIG. 18, the first gas type acceleration sensor 10-1 and the second gas type acceleration sensor 10-2 are arranged so as to be able to detect the accelerations of the two directions of the X direction and the Z direction. For example, by using detection results of the first gas type acceleration sensors 10-1 and the second gas type acceleration sensors 10-2, correction processing can be carried out.

Figure 19:
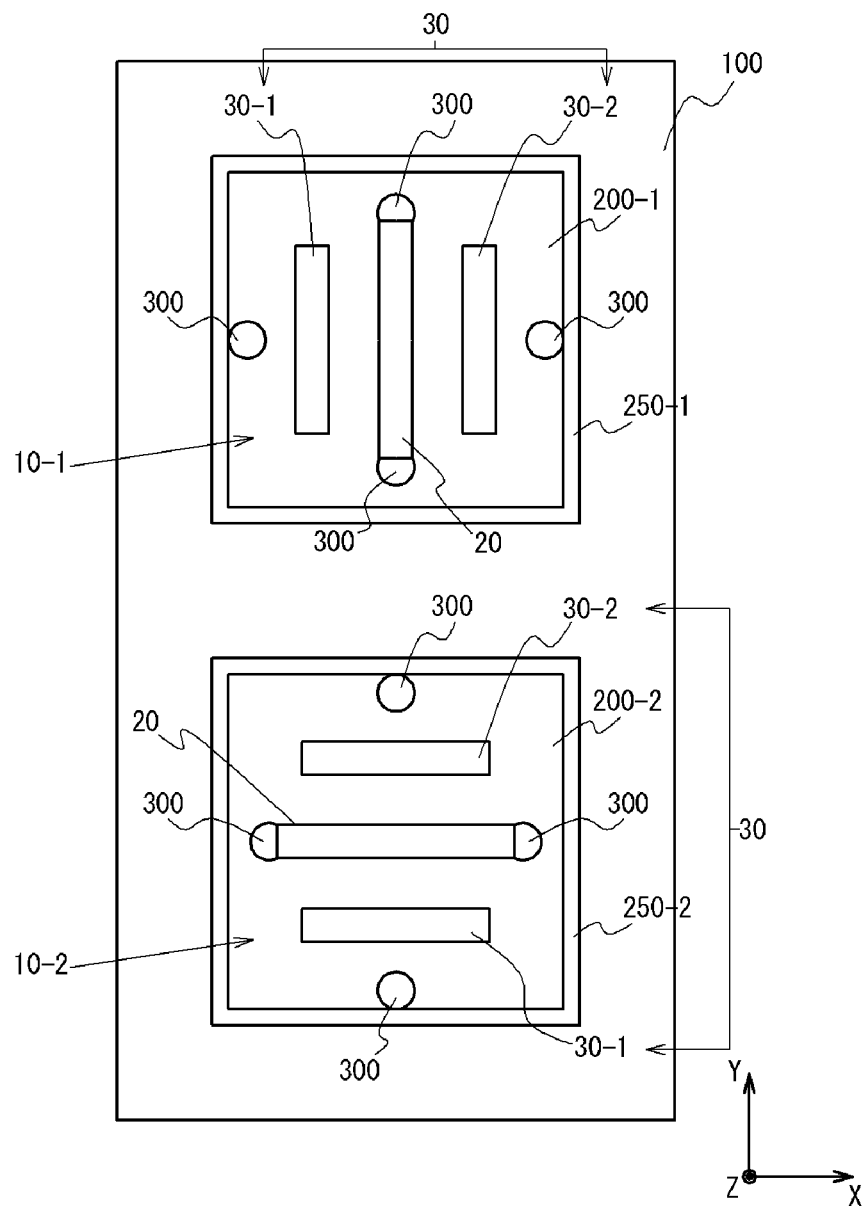
FIG. 19 is a plan view showing a planar structure of the semiconductor device according to the fifth embodiment.

As another example, the first gas type acceleration sensor 10-1 and the second gas type acceleration sensor 10-2 may differ in the direction of detection of acceleration. In an example shown in FIG. 19, the first gas type acceleration sensor 10-1 and the second gas type acceleration sensor 10-2 differ in an in-plane direction of the detection of acceleration (intersect with each other). In detail, the first gas type acceleration sensor 10-1 is arranged to be able to detect the accelerations of the two directions of the X direction and the Z direction. On the other hand, the second gas type acceleration sensor 10-2 is arranged to be able to detect the accelerations of the two directions of the Y direction and the Z direction. Thus, the accelerations of all the directions can be detected.

Note that the present embodiment can be combined with the above-mentioned embodiments in a range where there is no contradiction.

[Sixth Embodiment]

In a sixth embodiment, a plurality of gas type acceleration sensors 10 are provided for the semiconductor device, like the above-mentioned fifth embodiment. However, the sixth embodiment is different from the fifth embodiment in that a plurality of gas type acceleration sensors 10 are formed by using a single base chip 100 and a single cap chip 200. Note that the description which overlaps that of the fifth embodiment is appropriately omitted.

Figure 20:
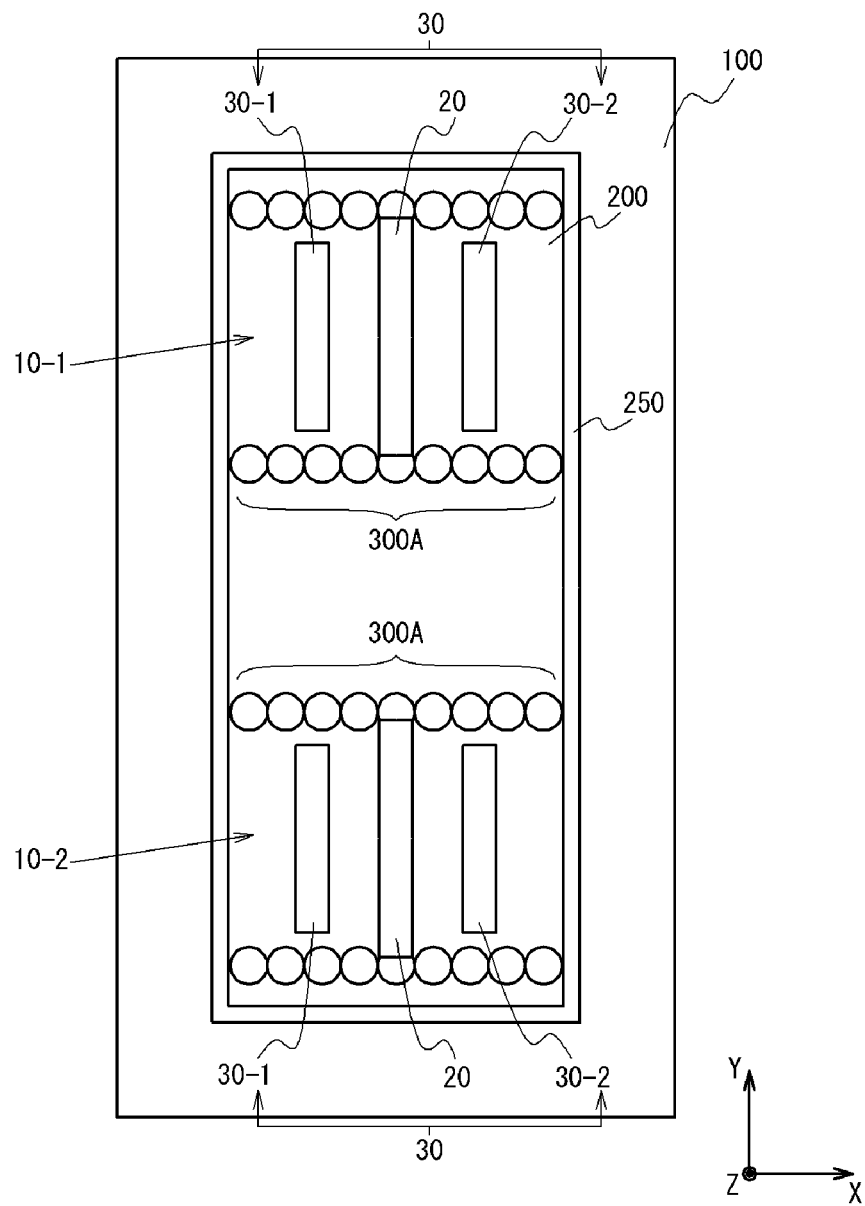
FIG. 20 is a plan view showing a planar structure of the semiconductor device according to a sixth embodiment.

As shown in FIG. 20, the single cap chip 200 is mounted on the single base chip 100. The cap chip 200 is surrounded with the side fill 250. The heater 20 of the first gas type acceleration sensor 10-1 and the heater 20 of the second gas type acceleration sensor 10-2 are formed in the single cap chip 200. The temperature sensors 30 of the first gas type acceleration sensor 10-1 and the temperature sensors 30 of the second gas type acceleration sensor 10-2 are formed in the single base chip 100.

Here, in order that the first gas type acceleration sensors 10-1 and the second gas type acceleration sensors 10-2 operate independently, the spaces 40 need to be secured, respectively. Therefore, according to the present embodiment, "a partition" is formed between the first gas type acceleration sensor 10-1 and the second gas type acceleration sensor 10-2 to separate the first gas type acceleration sensor 10-1 and the second gas type acceleration sensor 10-2.

As the partition, an insulating film may be formed. Or, the partition may be formed by using the bumps 300. Specifically, as shown in FIG. 20, "lines of bumps 300A" are formed by a plurality of bumps 300 which are arranged in lines without a gap. The line of bumps 300A may be used as the partition. Note that it is necessary to pay attention so that the line of bumps 300A does not contact the temperature sensors 30 on the side of the base chip 100, because the line of bumps 300A is conductive. Also, if the line of bumps 300A does not influence a neighbor gas type acceleration sensor, the line of bumps 300A may stand in line to have a small gap.

In an example shown in FIG. 20, each of the first gas type acceleration sensor 10-1 and the second gas type acceleration sensor 10-2 is arranged to be able to detect the accelerations of the two directions of the X direction and the Z direction. For example, by using a detection result by each of the first gas type acceleration sensors 10-1 and the second gas type acceleration sensors 10-2, correction processing can be carried out.

Figure 21:
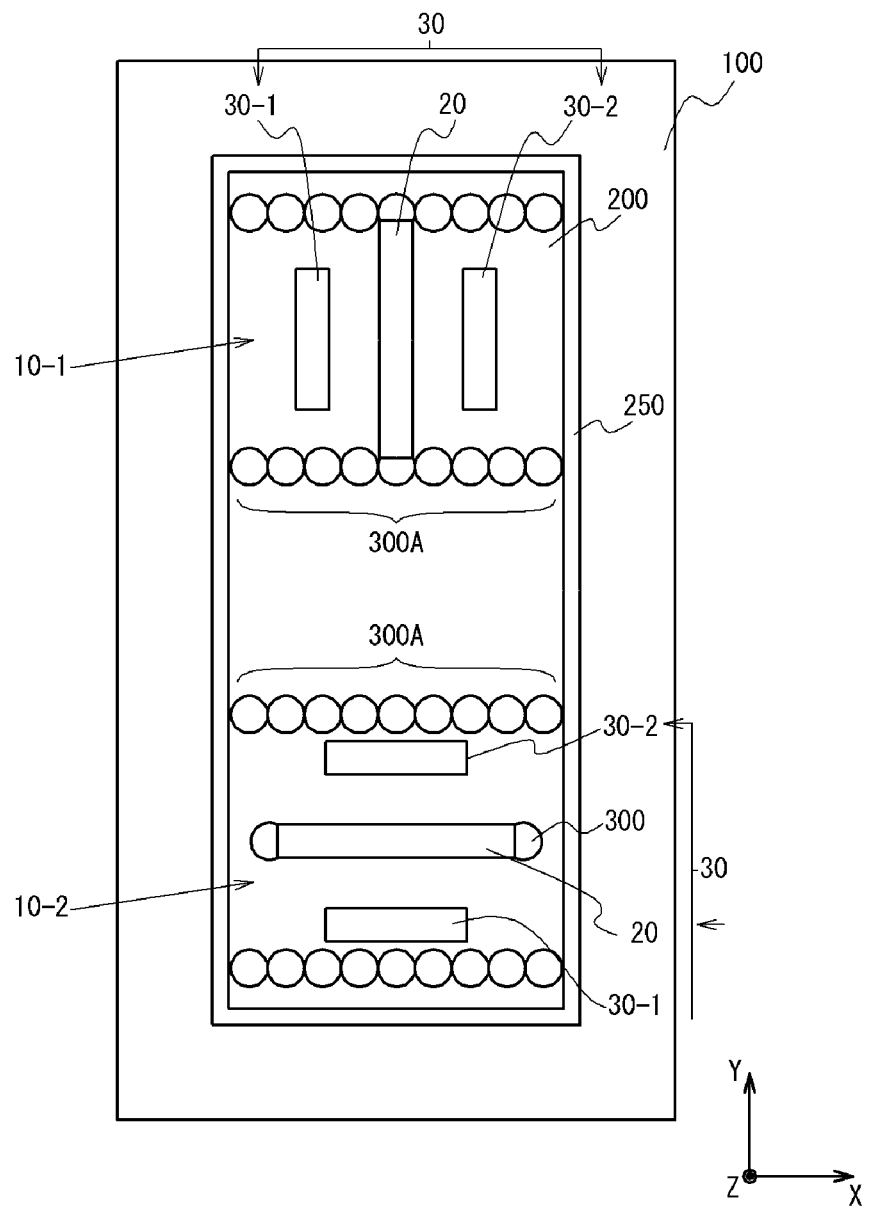
FIG. 21 is a plan view showing a planar structure of the semiconductor device according to the sixth embodiment.

As another example, the directions of detection of acceleration may be different between the first gas type acceleration sensor 10-1 and the second gas type acceleration sensor 10-2. In an example shown in FIG. 21, the in-plane detection directions of accelerations are different between the first gas type acceleration sensor 10-1 and the second gas type acceleration sensor 10-2 (intersect with each other). In detail, the first gas type acceleration sensor 10-1 is arranged to be able to detect the acceleration of the two directions of the X direction and the Z direction. On the other hand, the second gas type acceleration sensor 10-2 is arranged to be able to detect the acceleration of the two directions of the Y direction and the Z direction. Thus, the accelerations of all the directions can be detected.

Note that the present embodiment can be combined with the above-mentioned embodiments in a range where there is no contradiction.

As above, the present invention has been specifically described based on the embodiments. However, the present invention is not limited to the embodiments and can be modified in the range which does not deviate from the features of the present invention.

The invention claimed is:

1. A semiconductor device comprising:
   a gas type acceleration sensor which comprises a heater, a first temperature sensor and a second temperature sensor as components;
   a first chip, on a first surface of which said heater of the components is formed;
   a second chip, on a second surface of which said first temperature sensor and said second temperature sensor of the components are formed; and
   a connection member configured to connect said first chip and said second chip electrically,
   wherein said first chip and said second chip are laminated through said connection member such that said first surface and said second surface oppose to each other,
   wherein a position of said heater is different from a position of said first temperature sensor and a position of said second temperature sensor in a direction of the lamination of said first chip and said second chip,
   wherein said first temperature sensor and said second temperature sensor are arranged in a first in-plane direction orthogonal to the lamination direction to sandwich said heater and to oppose to each other,
   wherein one of said first chip and said second chip is a base chip, and the other is a cap chip which is laminated on said base chip, and
   wherein one of the components of said gas type acceleration sensor formed in said cap chip contacts said connection member directly.

2. The semiconductor device according to claim 1, wherein said first chip is said cap chip, and said second chip is said base chip.

3. The semiconductor device according to claim 1, wherein a defect density of a semiconductor substrate of said cap chip is higher than that of a semiconductor substrate of said base chip.

4. The semiconductor device according to claim 3, wherein said base chip has a transistor, and said cap chip does not have a transistor.

5. The semiconductor device according to claim 1, wherein said connection member comprises bumps.

6. The semiconductor device according to claim 1, wherein a direction which is orthogonal to the lamination direction and which intersects with the first in-plane direction is a second in-plane direction, and
   wherein one of the components of said gas type acceleration sensor comprises a metal wiring formed to extend into the second in-plane direction.

7. The semiconductor device according to claim 6, wherein said connection member comprises a couple of bumps disposed separately in the second in-plane direction, and
  wherein each of the components of said gas type acceleration sensor formed in said cap chip contacts said couple of bumps directly.

8. The semiconductor device according to claim 1, wherein said gas type acceleration sensor further comprises a third temperature sensor and a fourth temperature sensor as a part of the components,
  wherein said third temperature sensor and said fourth temperature sensor are formed in the first surface of said first chip, and
  wherein said third temperature sensor and said fourth temperature sensor are arranged to sandwich said heater and to oppose to each other in the first in-plane direction.

9. The semiconductor device according to claim 1, wherein said gas type acceleration sensor further comprises another heater as a part of the components,
  wherein said another heater is formed in the second surface of said second chip, and
  wherein said first temperature sensor and said second temperature sensor are arranged to sandwich said another heater and to oppose to each other in the first in-plane direction.

10. The semiconductor device according to claim 9, wherein said heater and said another heater are alternately turned on.

11. The semiconductor device according to claim 1, wherein a number of said gas type acceleration sensors is plural, and
  wherein each of said plurality of gas type acceleration sensors comprises the components.

12. The semiconductor device according to claim 11, wherein said plurality of gas type acceleration sensors comprises a first gas type acceleration sensor and a second gas type acceleration sensor, and
  wherein a first in-plane direction in said first gas type acceleration sensor intersects with a first in-plane direction in said second gas type acceleration sensor.

13. The semiconductor device according to claim 11, wherein a number of said cap chips is plural, and
  wherein said plurality of cap chips correspond to said plurality of gas type acceleration sensors, respectively.

14. The semiconductor device according to claim 11, wherein a partition is formed between adjacent two of said plurality of gas type acceleration sensors to separate the adjacent two of said plurality of gas type acceleration sensors from each other.

15. The semiconductor device according to claim 14, wherein said partition is formed from a plurality of bumps.

16. The semiconductor device according to claim 1, wherein insulating layers are formed on each of said base chip and said cap chip, and
  wherein the number of insulating layers on said base chip is greater than the number of insulating layers on said cap chip.

17. A semiconductor device comprising:
  a first chip, on which a temperature sensor of an acceleration sensor is arranged;
  a second chip, on which a heater of said acceleration sensor is arranged; and
  a connection member arranged between said first chip and said second chip to partition a space where said temperature sensor and said heater are arranged,
  wherein ends of said heater directly contact said connection member and are electrically connected with said first chip.

18. A method of manufacturing a semiconductor device which comprises: a gas type acceleration sensor which contains a heater, a first temperature sensor and a second temperature sensor as components,
  said method comprising:
  forming said heater of the components on a first surface of a first chip;
  forming said first temperature sensor and said second temperature sensor of the components on a second surface of a second chip; and
  flip-connecting said first chip and said second chip through said connection member such that the first surface and the second surface oppose to each other,
  wherein a position of said heater is different from a position of said first temperature sensor and a position of said second temperature sensor in a direction of lamination of said first chip and said second chip,
  wherein aid first temperature sensor and said second temperature sensor are arranged in a direction orthogonal to a first in-plane direction to sandwich said heater and to oppose to each other,
  wherein one of said first chip and said second chip is a base chip, and the other is a cap chip which is laminated on said base chip, and
  wherein one of the components of said gas type acceleration sensor formed on said cap chip contacts said connection member directly.

* * * * *